(No Model.)
A. E. KUNDERD.
ANIMAL TRAP.
No. 376,246. Patented Jan. 10, 1888.
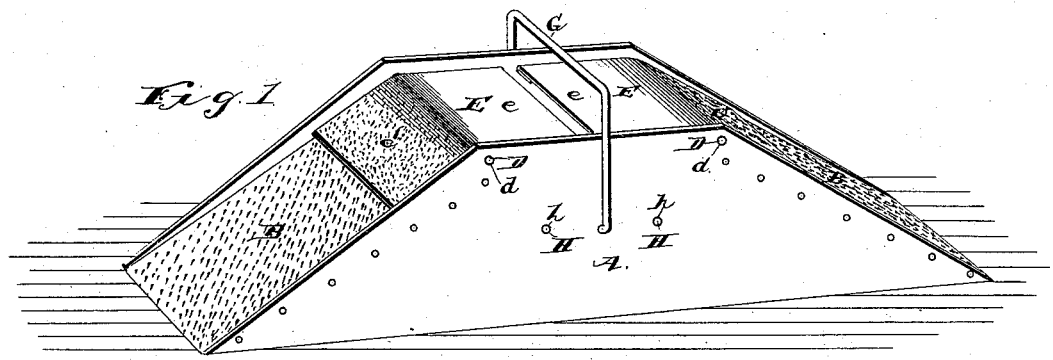
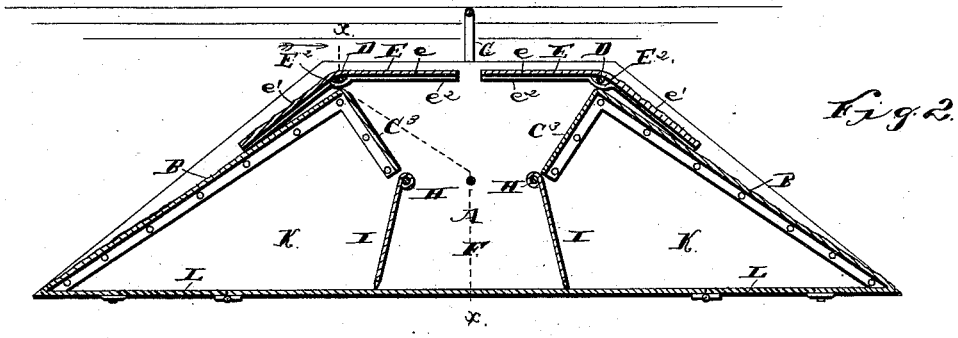
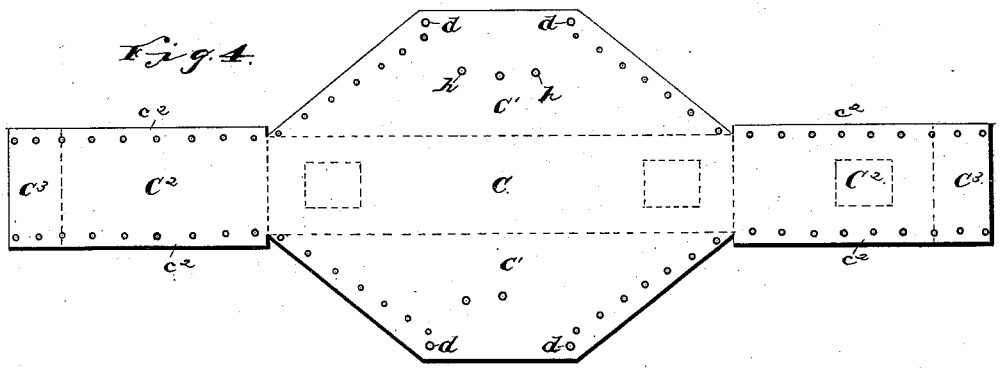
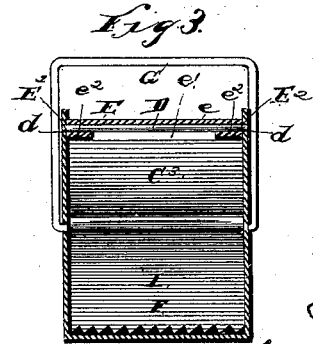
Witnesses
Geo. Thorpe
C. E. Doyle
Inventor
Amos E. Kunderd
By his Attorneys
C. A. Snowden

UNITED STATES PATENT OFFICE.

AMOS EUGENE KUNDERD, OF CORUNNA, INDIANA.

ANIMAL-TRAP.

SPECIFICATION forming part of Letters Patent No. 376,246, dated January 10, 1888.

Application filed November 12, 1887. Serial No. 255,006. (No model.)

*To all whom it may concern:*

Be it known that I, AMOS EUGENE KUNDERD, a citizen of the United States, residing at Corunna, in the county of De Kalb and State of Indiana, have invented a new and useful Improvement in Traps, of which the following is a specification.

My invention relates to traps for rats, mice, &c.; and it has for its object the provision of a device which is simple, cheap, effective, and durable.

With these objects in view the invention consists in forming a trap with vertical sides and inclined and roughened ends from a single sheet of metal and providing pivoted traps or drops on the upper side, which are adapted to swing down at the inner ends and precipitate the animal which steps on the traps or doors into the trap.

The invention consists, further, in providing chambers at the ends of the trap which are separated from the central chamber by swinging doors which open into the end chambers, but will not allow the animal in one of the end chambers to pass into the central chamber. The lower sides of the end chambers are provided with doors through which the animals may be removed.

The invention consists, further, in certain novel details of construction, which will be hereinafter more fully described in connection with the accompanying drawings, wherein—

Figure 1 is a perspective view of the trap. Fig. 2 is a longitudinal section of the same. Fig. 3 is a transverse section, line $x\ x$, Fig. 2. Fig. 4 is a plan view of the blank from which the body of the trap is formed.

Referring by letter to the drawings, A designates the body of the trap, having the inclined ends or walks B B, which should be roughened in any ordinary manner, as by puncturing or impressing the same, to enable the animal on the walk to obtain a foothold. The said body is preferably formed as follows: A blank is struck from a flat sheet of metal, having the rectangular or oblong fold C, the side folds, C' C', which are provided with beveled ends, and the end folds, $C^2\ C^2$, having the strips $c^2\ c^2$ on their side edges. The side folds are turned up at right angles to the bottom fold, C, and the end folds are bent inward until they are flush with the beveled ends of the side folds. The strips $c^2$ are now bent inward and riveted to the inner sides of the side folds, C'. It will be seen that there is a space left between the upper ends of the end folds or the walks B B.

D D designate transverse bars, which are arranged in openings $d\ d$ in the opposite sides of the body at the upper ends of the walks B B, and on the said bars are mounted the traps or drops E E. These drops or traps comprise, mainly, the horizontal leaves $e$, which project inward from the upper ends of the walks B over the space between the said walks and the inclined leaves $e'\ e'$, which are bent downward from the horizontal and rest on the said walks B. The leaves $e'$ are roughened to enable the animals to obtain a foothold, and they are slightly heavier than the leaves $e$, to normally maintain the latter in the horizontal position, which is shown in full lines in the drawings. (The dotted lines in Fig. 2 show the position of one of the drops when the horizontal leaf is depressed by the weight of an animal.) The side edges of the traps or drops are turned under to form the flanges $e^2$, in which flanges the bearings $E^2$ are formed. The said bearings are mounted on the rods D D, to pivot the drops in the trap.

G designates a bail which is attached at the ends to the sides of the trap at the center thereof. This bail extends across the center of the trap at the inner edges of the drops, and it serves as a support for the bait, as well as a handle by which to carry the trap.

H H designate transverse bars arranged at the ends in aligned openings $h\ h$ in opposite sides of the box, and the swinging doors I I are hung on the said bars. The doors I are slightly longer than the distance from the bars H to the bottom of the trap, and consequently they can swing only in one direction. They are so arranged as to swing from the central chamber, F, and into the end chambers, K K, so that when they are pressed upon by an animal in the central chamber they will yield, but when pressed upon by an animal in one of the end chambers they will resist. The lower edges of the said doors are provided with teeth to prevent the animal from backing out of the end chamber after having passed partly into the same. The ends of the end folds, $C^2$, are provided with the flaps or guards $C^3$, which are designed to pass within the body of the trap and be bent down until their lower edges are close to the bars H. Thus it will be seen that the end chambers are entirely separated from the central chamber, so that an animal in one of the end chambers cannot pass into the central chamber.

The bars H serve as stops to limit the swing or the downward motion of the traps or drops E, it being obvious that if the heavier leaf, $e'$, should pass over or beyond the vertical line over the bar D the drop would not reassume its former position.

The operation of the device will be obvious from the foregoing. The mouse or rat passes up the inclined walk at one end of the trap, and to reach the bait, which is suspended on the bail, it steps on the horizontal and unsupported leaf of the drop. The latter yields and precipitates the animal into the central chamber, F. In endeavoring to make its escape the animal runs against one of the swinging doors I, which yields and allows the prisoner to pass into one of the end chambers, from which it cannot escape.

L L designate doors in the bottom of the chambers K K, through which the animals may be removed. These doors are preferably hinged to the bottom fold and provided with hasps or locks to fasten them in the closed position.

This device is very simple and effective, and yet, if it is desirable to still further simplify the construction, the swinging doors I may be omitted. I prefer, however, to include these doors, as the safety of the trap is thus increased.

Having thus described my invention, I claim—

1. In a trap, the combination of the body A, having the inclined and roughened walks B B, the transverse bars D D at the upper ends of the walks, the transverse bars H H below the upper ends of the walks, the angular drops or traps E E, mounted on the bars D, the guards $C^3$, extending from the upper ends of the walks to the bars H, and the swinging doors I I, mounted on the bars H, substantially as and for the purpose specified.

2. In a trap, the combination of the body A, the pivoted traps or drops E, the depending guards or flaps $C^3$, and the doors I, pivoted at their upper edges below the lower ends of the said guards, and having their lower edges provided with teeth, substantially as and for the purpose specified.

3. The herein-described trap, consisting of the body A, comprising the bottom fold, C, the side folds, C' C', having inclined or beveled ends, the end folds, $C^2 C^2$, provided with the side strips, $c^2 c^2$, adapted to be secured to the inner sides of the side folds, and the flaps $C^3 C^3$ on the ends of the end folds and adapted to be bent downward to form the guards, as described, the swinging doors I I at the lower ends of the said guards or flaps $C^3$, and the pivoted traps or drops E E at the upper edges of the end flaps, $C^2$, all constructed and arranged substantially as and for the purpose specified.

In testimony that I claim the foregoing as my own I have hereto affixed my signature in presence of two witnesses.

AMOS EUGENE KUNDERD.

Witnesses:
W. J. LANNING,
O. P. RABER.